United States Patent [19]

Woods et al.

[11] Patent Number: 5,337,847
[45] Date of Patent: Aug. 16, 1994

[54] FOUR-WAY LEVELLING MECHANISM FOR OFF-ROAD VEHICLE

[75] Inventors: Randy J. Woods; Reggald E. Isley, both of Grande Prairie, Canada

[73] Assignee: Risley Fluidic Power Ltd., Alberta, Canada

[21] Appl. No.: 4,950

[22] Filed: Jan. 15, 1993

[51] Int. Cl.⁵ .................. B62D 55/00; B62D 33/067
[52] U.S. Cl. .................... 180/9.52; 180/41; 180/89.14; 280/6.12; 414/687; 144/3 D; 248/188.2
[58] Field of Search .............. 180/9.5, 9.52, 89.13, 180/89.14, 6.58, 6.6, 41; 280/840, 6.11, 6.12, DIG. 1; 414/687, 699, 23; 144/3 D, 34 R; 248/371, 188.2

[56] References Cited

U.S. PATENT DOCUMENTS

| | | | |
|---|---|---|---|
| 2,828,137 | 3/1958 | Wagner | 280/111 |
| 3,506,079 | 4/1970 | Madler et al. | 180/41 |
| 4,324,304 | 4/1982 | Hashimoto et al. | 180/9.52 |
| 4,326,571 | 4/1982 | Crawford | 144/34 E |
| 4,350,190 | 9/1982 | McColl | 144/3 D |
| 4,565,486 | 1/1986 | Crawford et al. | 414/729 |
| 4,650,017 | 3/1987 | Pelletier et al. | 180/9.1 |
| 4,763,742 | 8/1988 | Langford | 180/9.1 |
| 4,823,852 | 4/1989 | Langford | 144/3 D |
| 4,899,841 | 2/1990 | Hawbaker et al. | 180/9.52 |

*Primary Examiner*—Margaret A. Focarino
*Assistant Examiner*—Paul N. Dickson
*Attorney, Agent, or Firm*—Seed and Berry

[57] ABSTRACT

A four way tilt mechanism maintaining the superstructure of an off-road vehicle generally horizontal while the vehicle is working on uneven terrain is disclosed. The tilt mechanism is very robust and provides independent adjustment of the angle of tilt relative to each of two pivot axes. The tilt mechanism incorporates a spherical bearing mounted on a shaft perpendicular to the longitudinal pivot axis of the tilt mechanism to eliminate end-play in the joint which forms the longitudinal pivot axis. The longitudinal and transverse pivot axes lie in the same plane so that many of the the forces which are transferred from the superstructure of the vehicle through the tilt mechanism to the chassis of the vehicle cannot cause a torque on the components of the tilt mechanism.

19 Claims, 8 Drawing Sheets

FOUR-WAY LEVELLING MECHANISM FOR OFF-ROAD VEHICLE

FIELD OF THE INVENTION

This invention relates to a four-way levelling mechanism.

The mechanism may be used in an off-road vehicle, such as a tree harvesting machine to maintain the superstructure of the vehicle level when the vehicle is working on sloping terrain.

BACKGROUND OF THE INVENTION

Off-road machines for felling trees and for handling felled trees ("feller bunchers") have achieved wide acceptance in the forest industry. Such machines typically have a crawler type undercarriage for mobility over uneven terrain, a superstructure attached to the undercarriage and an extendable boom attached to the superstructure. The superstructure typically houses an engine and hydraulic pump system to operate the machine's moving parts and generally comprises a cab from which the machine operator controls the machine. Accessories such as grapples, tree falling heads, cut off saws, or de-limbing devices are typically mounted to the boom. The superstructure is typically mounted to the undercarriage on a pivot so that the superstructure and boom can be swung about a vertical axis.

Tree harvesting machines of the type described above are often used off-road on uneven terrain. Therefore, when the vehicle has been driven to a desired position to do work the undercarriage of the vehicle may not be horizontal. It is highly desirable, however, for the comfort of the operator and for the most efficient functioning of the machine that the superstructure of the machine be horizontal while the machine is working. Furthermore, in general, the trees which the machine harvests grow essentially vertically. When the machine is used to handle standing trees, as opposed to previously cut trees, and the superstructure is maintained horizontal while the machine is working then a boom-mounted accessory can be designed to work on a vertical tree without the need for an additional mechanism to tilt the accessory to align with the tree. Accordingly, it has been found to be useful to mount a tilting mechanism between the superstructure of the machine and the undercarriage. The operator of the machine can adjust the tilting mechanism to keep the super structure horizontal even when the undercarriage of the machine is inclined at a significant angle to the horizontal.

Early tilting mechanisms only provided for rotation about a single axis. These tilting mechanisms are called "two-way" tilting mechanisms because they allow the angle of tilt to be adjusted in two directions about the single axis. To maintain the superstructure of a machine equipped with a two-way tilting mechanism horizontal the operator of the machine must orient the machine with the tilting axis perpendicular to the fall line of the ground under the machine's undercarriage. A two-way tilting mechanism cannot generally maintain the superstructure of a machine horizontal when the tilting axis is not horizontal.

So called "four way" tilting mechanisms allow the superstructure of a machine to be tilted back and fourth about each one of a pair of mutually perpendicular axes. A four-way tilting mechanism is therefore capable of maintaining the superstructure of a machine level independently of the direction of inclination of the undercarriage.

Conventional prior art tilt mechanisms have pin joints which permit pivotal motion about the pivot axes of the tilt mechanism. In a pin joint a first member pivots relative to a second member about one or more pivot pins which lie along a pivot axis. In a typical pin joint a projection extends from the second member between two parts of the first member. A hole passes through the projection. The pivot pin extends through the hole in the projection and extends into holes in the first member on either side of the projection. Suitable bushings are provided between the pin and the first and or second members to allow the second member to pivot relative to the first member about the pivot pins.

A problem with pin joints as described above is that it is difficult to eliminate end play in the joint. That is, it is difficult to desig the joint in a way which prevents the projecting part of the second member from moving from side to side along the pivot pin between the two parts of the first member.

When a pin joint is used to form the tilt axis in the tilt mechanism of a heavy piece of machinery, such as a tree harvesting machine, the end play in the pin joint can cause significant problems. It is difficult to make such tilting mechanisms in a manner which prevents motion of the superstructure of the machine relative to the undercarriage in a direction parallel to the pivot axes.

In a tree harvesting machine very large alternating forces are applied to the superstructure of the machine when the boom is extended and retracted and when the superstructure is swung back and forth about its vertical swing axis. If these forces are directed parallel to the axis of one of the pin joints in the tilting mechanism of the machine then the forces can cause the superstructure to move relative to the undercarriage along the pin joint's pins until the end play in the joint is taken up. When the end play is completely taken up the member connected to the superstructure, which forms one half of the pin joint, hammers against the member connected to the chassis of the machine, which forms the other part of the pin joint. Repeated hammering on the pin joints can cause the components of the joints to become fatigued and can lead to premature failure of the machine. Furthermore, the hammering causes vibration throughout the machine which makes the machine noisy and uncomfortable for the operator and can harm components of the machine.

SUMMARY OF THE INVENTION

The invention provides a tilt mechanism for pivotally mounting the superstructure of a vehicle to a chassis. The tilt mechanism comprises a first pivot pin defining a first pivot axis. The first pivot pin passes through an aperture in a first member connected to the chassis and through an aperture in a second member coupled to the superstructure. The tilt mechanism further comprises a spherical bearing having a centre of rotation lying on the first pivot axis, first connecting means rigidly fixing a first half of the spherical bearing with respect to the first member and second connecting means rigidly fixing a second half of the spherical bearing to the second member. The first member is pivotable relative to said second member about the pivot axis.

The invention further provides a vehicle comprising a chassis, a superstructure mounted to a top plate, and a mechanism for tilting the top plate relative to the chassis about a first axis. The mechanism comprises a spherical bearing mounted to the chassis, a rotary coupling, a rigid mid-frame coupled to the spherical bearing and to the rotary coupling, for pivotal motion of the mid-frame about the first axis and means connecting the mid-frame to the top plate. The spherical bearing has a centre of rotation lying on the first axis. The rotary coupling has a pivot axis lying on the first axis and is mounted to the chassis at a point spaced apart from the spherical bearing.

DETAILED DESCRIPTION OF THE PREFERRED EMBODIMENT

Figure 1:
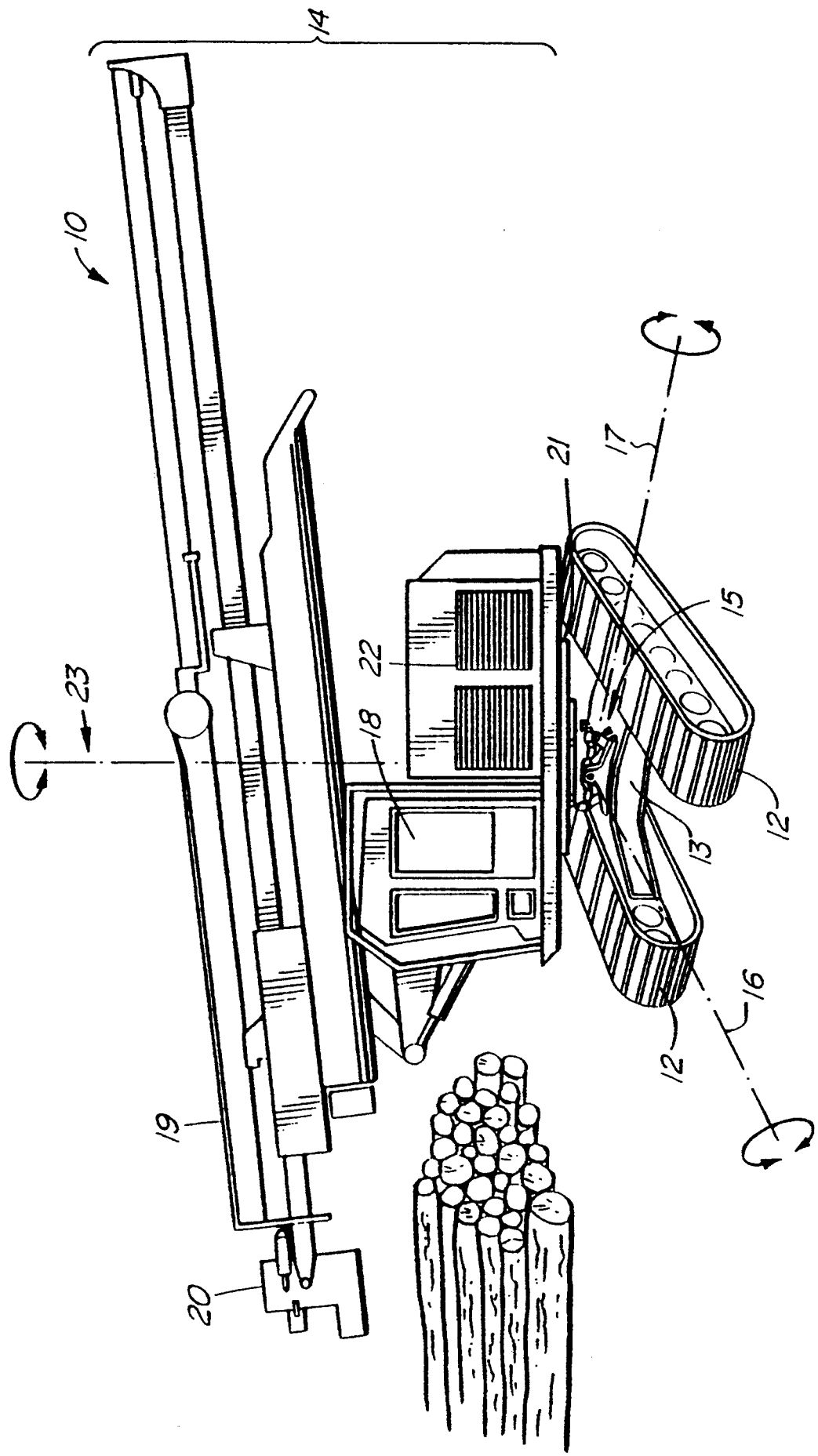
FIG. 1 is a perspective view of a logging machine incorporating a four-way tilt assembly according to the invention.

FIG. 1 shows a tree harvesting machine 10 which incorporates a tilt mechanism 15 according to the invention. Machine 10 has a pair of tracks 12 for mobility. Tracks 12 are mounted on either side of chassis 13 parallel to the longitudinal axis of chassis 13. Alternative ground engaging members such as wheels or movable legs may be used in place of tracks 12.

Superstructure 14 is mounted atop tilt mechanism 15, which is mounted atop chassis 13. Tilt mechanism 15 has a pair of mutually perpendicular pivot axes 16, 17. Longitudinal pivot axis 16 is parallel to the longitudinal centre-line of chassis 13. Superstructure 14 can be tilted from side to side relative to chassis 13 about pivot axis 16, as explained below. Transverse pivot axis 17 is parallel to the transverse axis of chassis 13. Superstructure 14 can be tilted fore and aft relative to chassis 13 about transverse pivot axis 17, as will also be explained. Preferably, longitudinal pivot axis 16 intersects transverse pivot axis 17.

Superstructure 14 comprises operator's cab 18, boom 19, tree cutting and handling head 20, turntable 21, and motor housing 22. Turntable 21 allows for rotation of superstructure 14 about vertical axis 23.

Figure 2:
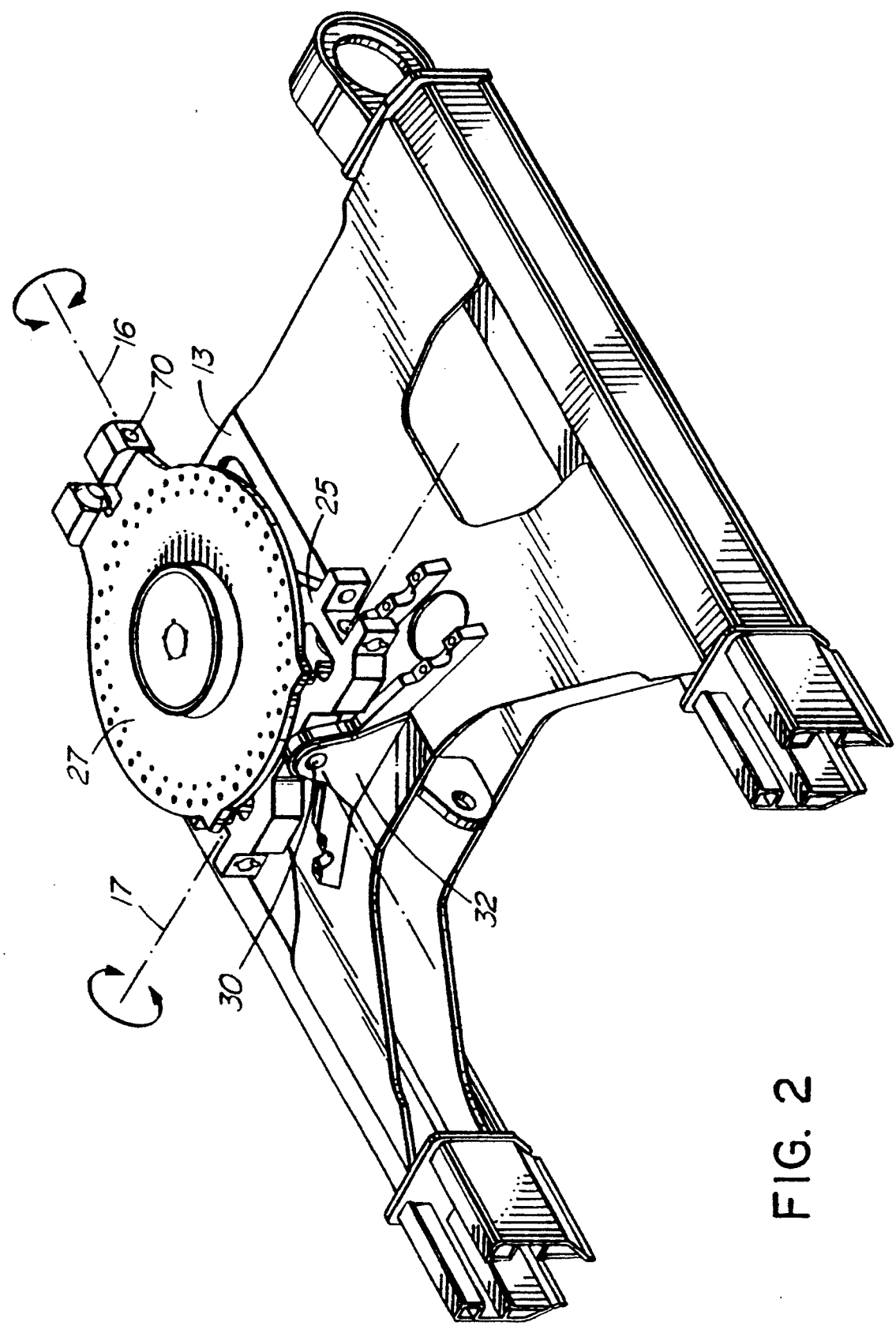
FIG. 2 is a perspective view of a four way tilt mechanism according to the invention.
Figure 3:
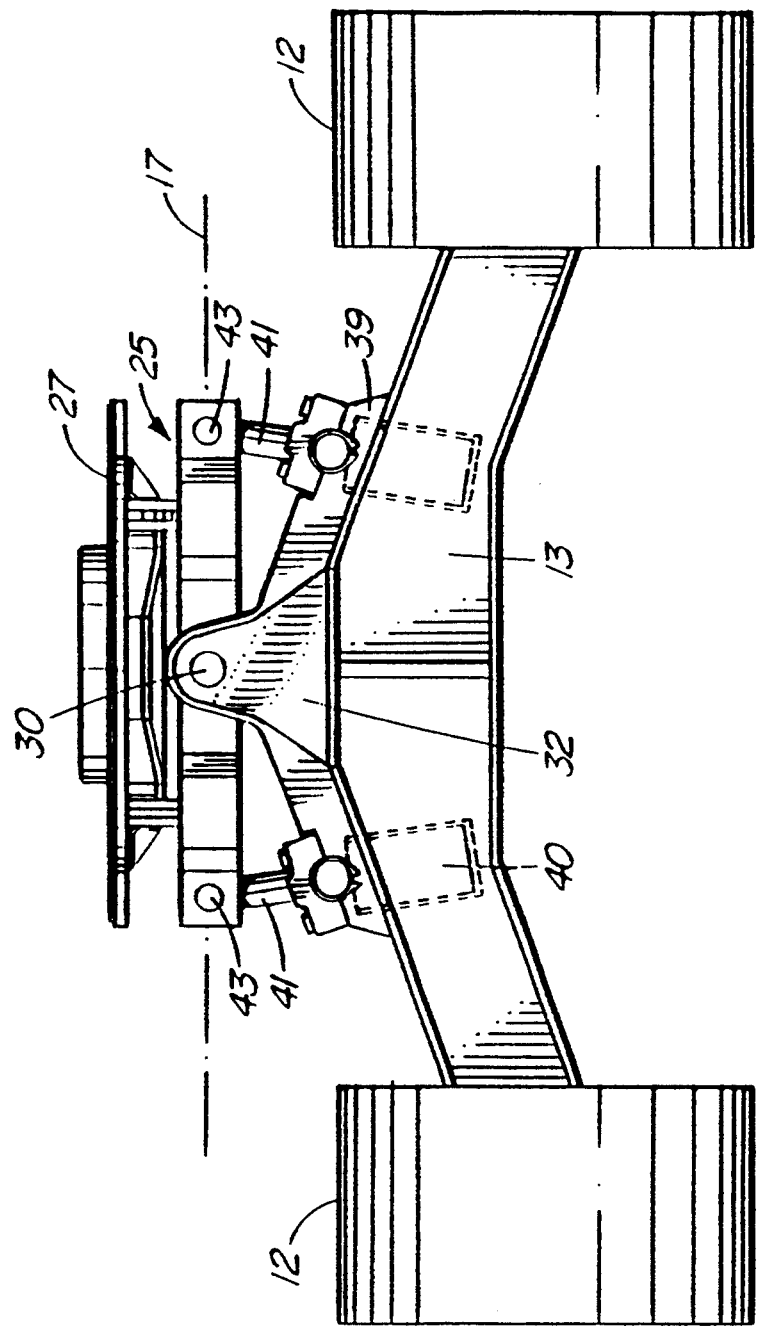
FIG. 3 is a front elevation view of the tilt mechanism of FIG. 2.

FIGS. 2 through 7 show tilt mechanism 15 in greater detail. As shown in FIG. 2, tilt mechanism 15 comprises mid-frame 25 which is pivotally mounted to chassis 13 for rotation about longitudinal pivot axis 16, and top plate 27. As explained below in greater detail, the forward end of top plate 27 is pivotally mounted to the forward end of mid-frame 25 for rotation about transverse pivot axis 17. Top plate 27 tilts from side to side with mid-frame 25 as mid-frame 25 is tilted about longitudinal pivot axis 16. Therefore, the angle of top plate 27 relative to longitudinal pivot axis 16 is always the same as the angle of mid-frame 25 relative to longitudinal pivot axis 16. Turntable 21 of superstructure 14 is rigidly fastened atop top plate 27. Superstructure 14 can therefore be maintained level when chassis 13 is inclined at an angle to the horizontal by adjusting the inclination of top plate 27 about axes 16 and 17 until top plate 27 is level.

Figure 5:
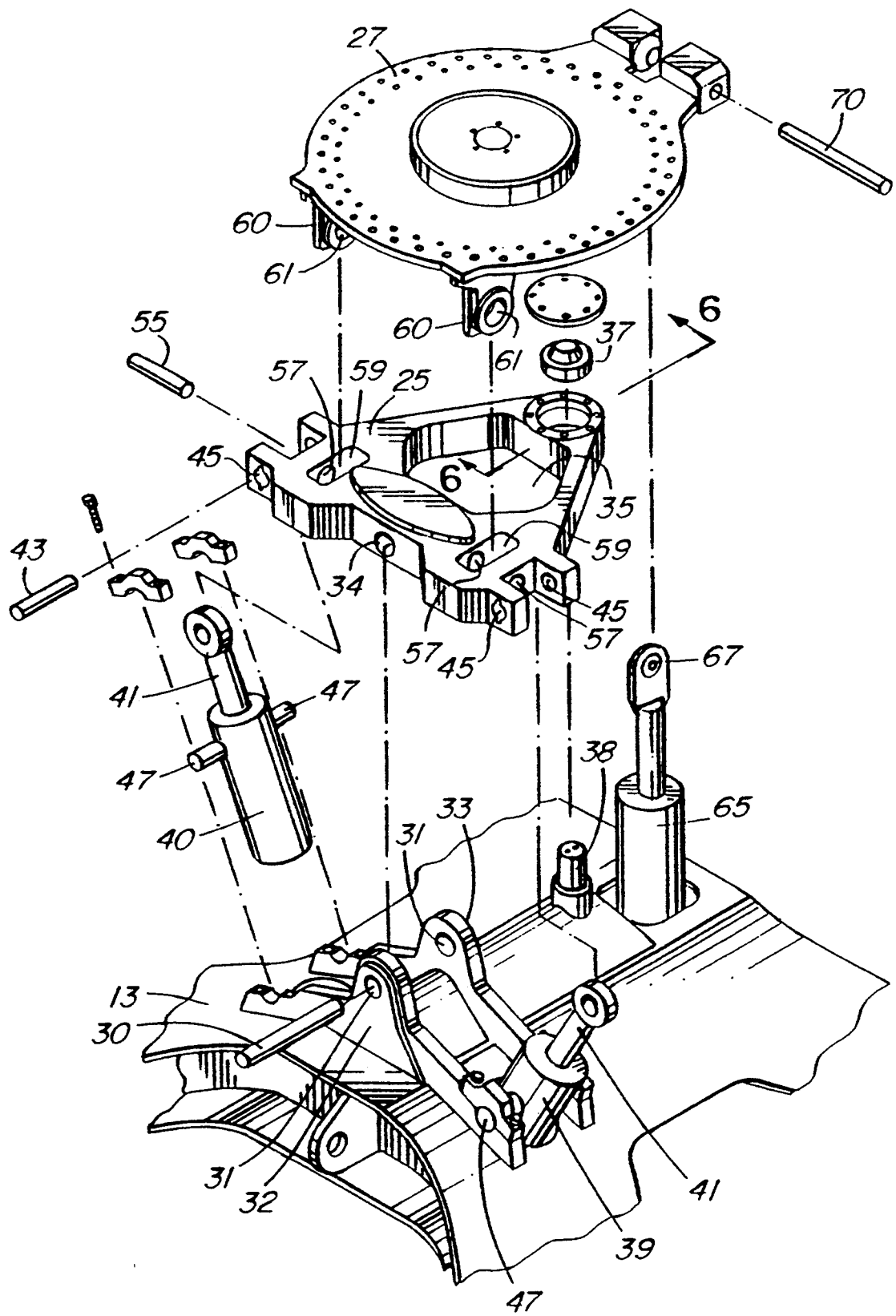
FIG. 5 is an exploded perspective view of the tilt mechanism of FIG. 2.

The front portion of mid-frame 25 is coupled to chassis 13 by a standard pin joint. The pin joint constitutes a rotary coupling between mid-frame 25 and chassis 13. As shown in FIGS. 2 and 5, the pin joint comprises a pivot pin 30. The centre-line of pivot pin 30 defines longitudinal axis 16. Pivot pin 30 extends through holes 31 in a pair of parallel transversely mounted ears 32, 33 which extend vertically from chassis 13 and through hole 34 in the front portion of mid-frame 25 to pivotally connect chassis 13 to mid-frame 25. Ear 32 abuts the front edge of the front portion of mid-frame 25. Ear 33 extends into an aperture 35 in the centre of mid-frame 25 and abuts the rear edge of the front portion of mid-frame 25.

Ear 32 constitutes a first member connected to chassis 13. Mid-frame 25 constitutes a second member coupled to superstructure 14 by top plate 27. Top plate 27 constitutes a third member coupled to superstructure 14.

As in any pin joint, it is difficult to construct ears 32, 33 and mid-frame 25 in a manner which prevents the front portion of mid plate 25 from sliding longitudinally back and forth along pin 30 between ears 32, 33.

Figure 6:
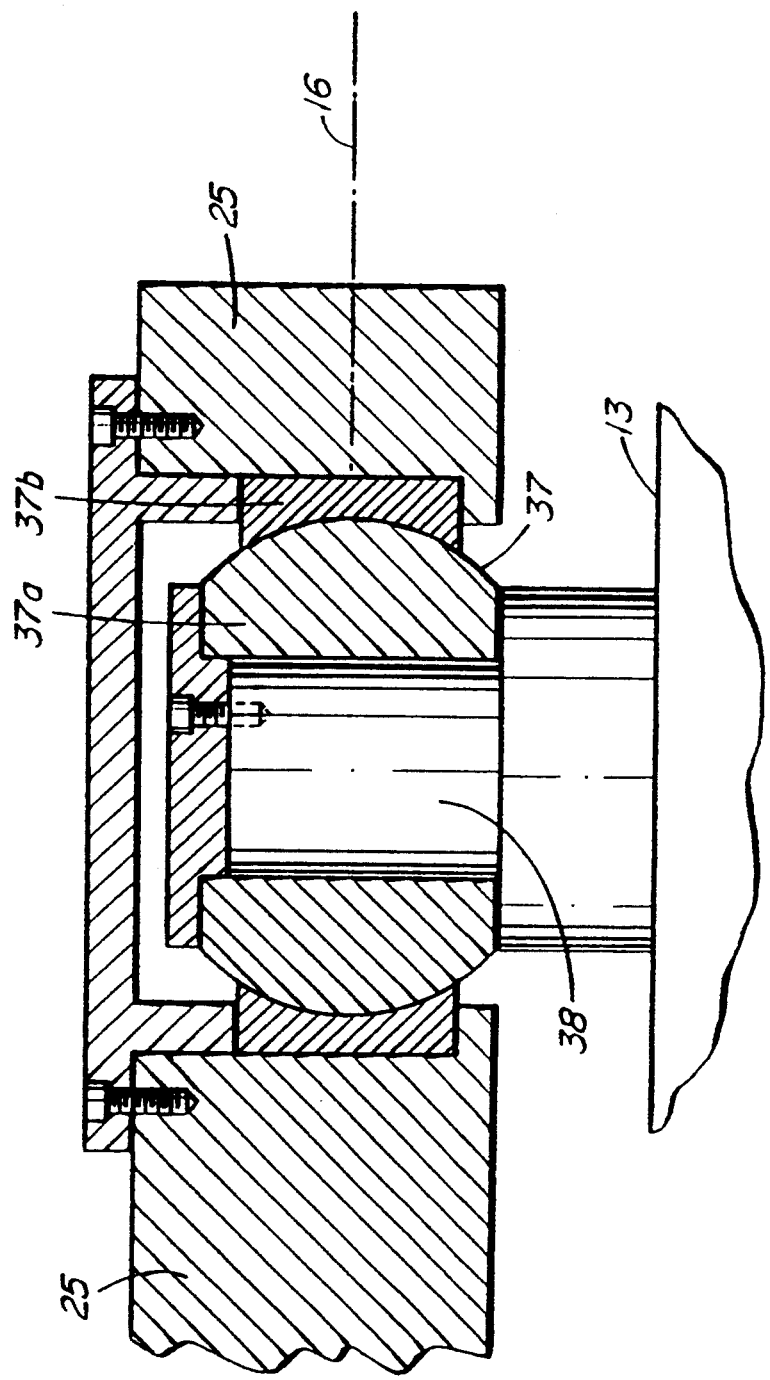
FIG. 6 is a vertical section through the spherical ball of the tilt mechanism of FIG. 4 along line 6—6.

As is best shown in FIGS. 5 and 6, the rear portion of mid-frame 25 is supported by spherical bearing 37. Spherical bearing 37 is mounted to the top of chassis 13 on vertical shaft 38. The centre of rotation of spherical bearing 37 lies on pivot axis 16. Spherical bearing 37 accordingly allows mid-frame 25 to tilt from side to side about pivot axis 16. By its nature, spherical bearing 37 prevents any linear motion of mid-frame 25 in a direction perpendicular to shaft 38. Therefore, spherical bearing 37 prevents mid-frame 25 from moving along axis 16 and, in particular, prevents the forward portion of mid-frame 25 from sliding back and forth along pin 30 and hitting ears 32, 33. Spherical bearing 37 may be, for example, a part number 120FSH 210-SS spherical bearing available from Torrington Fafner, a division of Ingersoll Rand Worldwide, of South Bend, Ind., U.S.A. A ball and socket joint may also be used as spherical bearing 37. Other self-aligning bearings may also be used for spherical bearing 37. The desired characteristics of spherical bearing 37 are that it permit rotation relative to a horizontal axis but that it restrict linear motion in directions perpendicular to shaft 38.

As shown in FIG. 6, spherical bearing 37 comprises a ball 37a and a socket 37b. Ball 37a is bored to fit on shaft 38. Shaft 38 and chassis 13 comprise a first connecting means rigidly fixing a first half of said spherical bearing with respect to ears 32, 33. Longitudinal pivot axis 16 passes through the centre of ball 37a. Socket 37b has an inner surface which conforms to the spherical outer surface of ball 37a to permit socket 37b to pivot about the centre of ball 37a. Socket 37b is attached to mid-frame 25. The attachment of socket 37b to mid-frame 25 constitutes a second connecting means rigidly fixing a second half of spherical bearing 37 to mid-frame 25.

Mid-frame 25 can be tilted from side to side about pivot axis 16 by means of hydraulic cylinders 39, 40 (FIGS. 3 and 5) which are preferably double acting hydraulic cylinders. Hydraulic cylinders 39, 40 may be replaced with some other type of power jack. In light duty applications, only one of hydraulic cylinders 39, 40 may be needed.

The ends of the pistons 41 of hydraulic cylinders 39, 40 are pivotally connected to mid-frame 25 by pins 43 which pass through holes 45 in mid-frame 25. The barrels of hydraulic cylinders 39, 40 are pivotally mounted to the top of chassis 13 by trunnions 47 which extend from either side of the barrels of cylinders 39, 40 parallel to longitudinal tilt axis 16.

Trunnion mounting of hydraulic cylinders 39, 40 has several advantages. First, the forces developed by cylinders 39, 40 are applied to the top surface of chassis 13. It is easier to design chassis 13 to bear weight on its top surface than it is to design chassis 13 with internal mounting points for the lower ends of cylinders 39, 40. Second, trunnion mounting of cylinders 39, 40 allows tilt mechanism 15 to have a low profile without unduly limiting the stroke of hydraulic cylinders 39, 40. This allows the centre of gravity of machine 10 to be kept low.

Mid-frame 25 can be tilted downwardly to the left (as viewed in FIG. 5) by extending piston 41 of cylinder 39 and simultaneously retracting piston 41 of cylinder 40. Mid-frame 25 can be tilted downwardly to the right by extending piston 41 of cylinder 40 and simultaneously retracting piston 41 of cylinder 39. Cylinders 39 and 40 are preferably mounted so that they are angled slightly outwardly.

As noted above, top plate 27 is pivotally coupled to the forward portion of mid-frame 25. The coupling (FIG. 5) comprises transversely mounted pivot pins 55 (only one of which is shown in FIG. 5) which define transverse pivot axis 17. Pivot pins 55 are mounted in transverse holes 57 in the forward portion of mid-frame 25. Holes 57 intersect a pair of openings 59 which extend through mid-frame 25 on either side of hole 34, between hole 34 and holes 45. Top plate 27 is provided with a pair of downwardly extending ears 60. Ears 60 extend into openings 59 and pivot pins 55 extend through holes 61 in ears 60. Preferably, the centre-lines of holes 57 intersect with the centre-lines of holes 34, 45; and, the centre-lines of holes 34, 45 and 57, all lie in the same plane. That is, transverse pivot axis 17 intersects longitudinal pivot axis 16.

The rear portion of top plate 27 is supported by power jack 65 which is preferably a hydraulic cylinder. The angle of top plate 27 relative to mid-frame 25 and chassis 13 may be altered by extending or retracting power jack 65.

Figure 4:
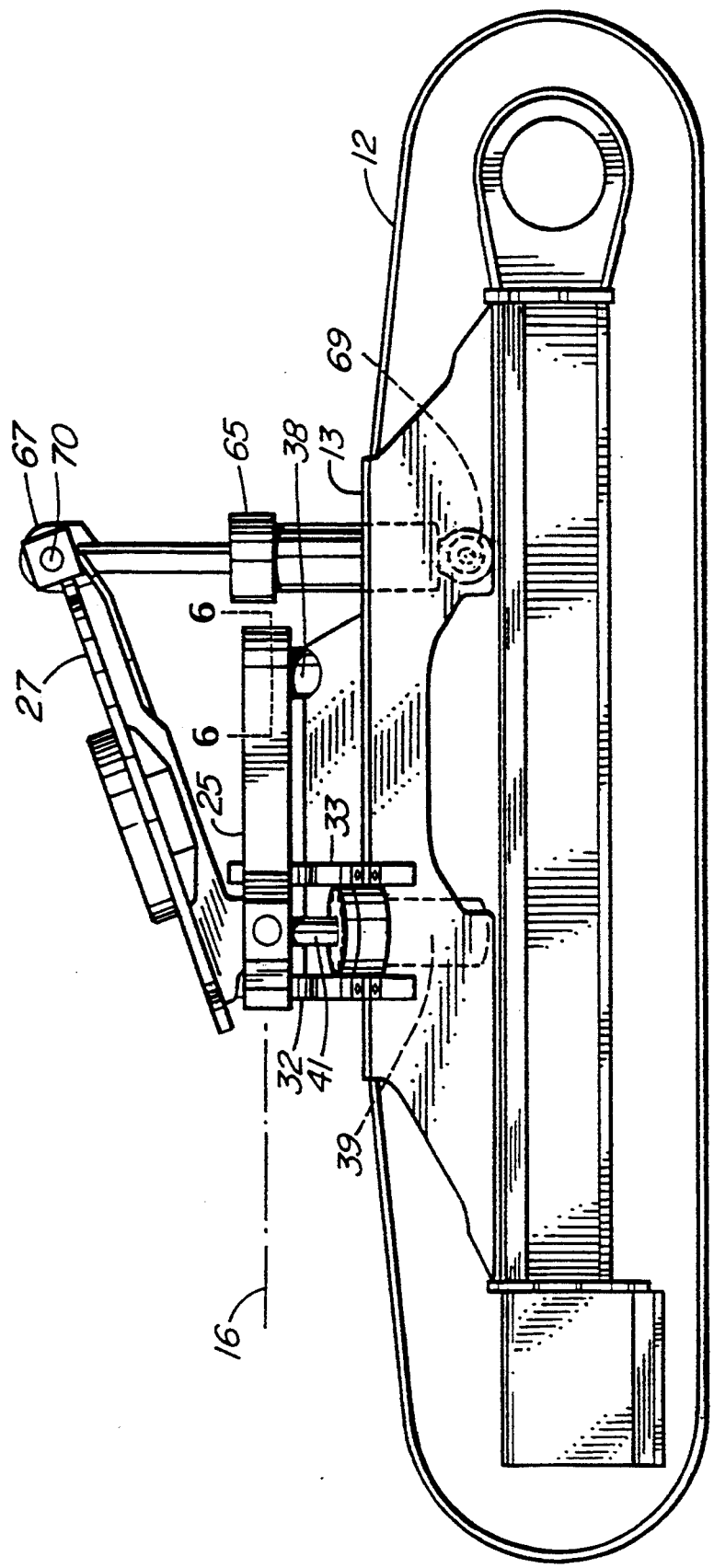
FIG. 4 is a side elevation view of the tilt mechanism of FIG. 2.
Figure 9:
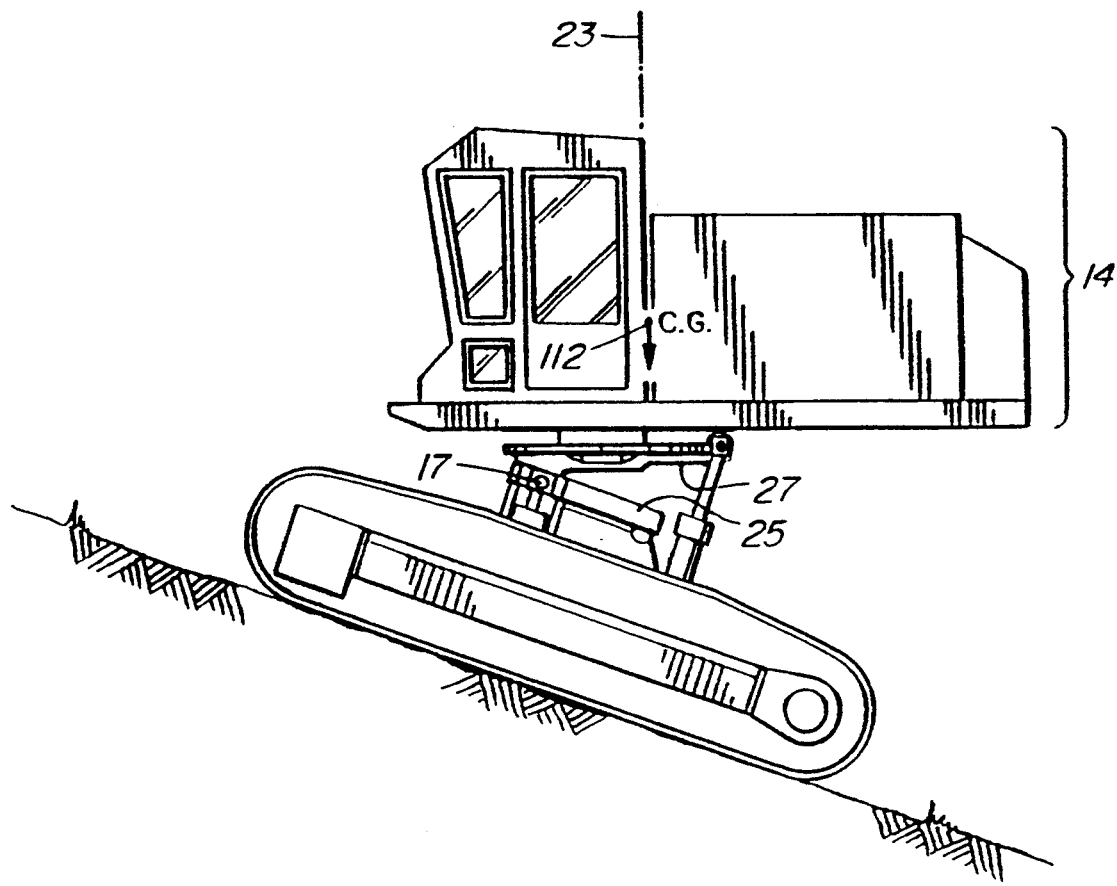
FIG. 9 is a schematic view of the machine of FIG. 1 working on an up slope.

The angular range of motion of top plate 27 about transverse axis 17 is limited by the length of top plate 27 and the travel of power jack 65. Tilting mechanism 15 may be designed so that the range of motion of top plate 27 is shifted to provide more motion relative to the horizontal in one direction about transverse axis 17 than in the other. For example, as shown in FIGS. 4 and 9, tilt mechanism 15 may be constructed to permit top plate 27 to be tilted much farther forward about axis 17 than it can be tilted backward. This permits top plate 27, within its given limited range of motion, to be maintained horizontal when undercarriage 13 is travelling forward up a relatively steep slope (FIG. 9).

Figure 7:
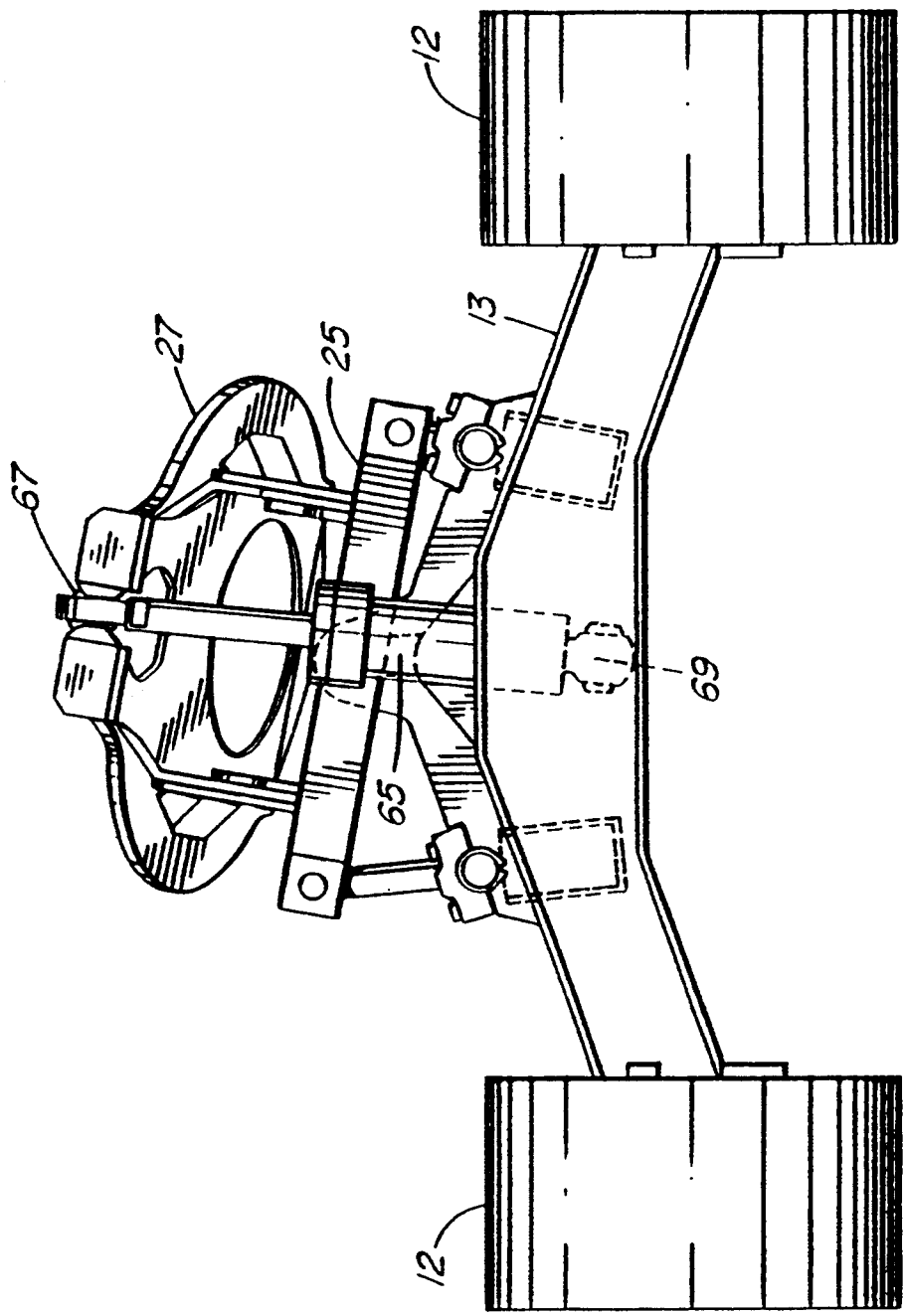
FIG. 7 is a rear elevation view of the tilt mechanism of FIG. 2.

As shown in FIG. 7, spherical bearings 67 and 69 are mounted at the top and bottom ends respectively of power jack 65. The top end of power jack 65 is pivotally mounted to top plate 27 by pin 70 (FIG. 5) which extends through the centre of spherical bearing 67. The lower end of power jack 65 is pivotally mounted to chassis 13 by another pin (not shown) which passes through the centre of spherical bearing 69. The two pins allow the vertical angle of inclination of power jack 65 to change as top plate 27 is pivoted about transverse pivot axis 17 (i.e. when power jack 65 is extended and retracted).

Top plate 27 tilts from side to side together with mid-frame 25. That is, when mid-frame 25 is tilted from side to side relative to chassis 13 about longitudinal pivot axis 16, as described above, the angle of top plate 27 also changes with respect to chassis 13. Because power jack 65 extends between chassis 13 and top plate 27 the angles of attachment of power jack 65 to pin 70 and the pin supporting the lower end of power jack 65 must change as mid-frame 25 is tilted from side to side about pivot axis 16. Spherical bearings 67 and 69 allow the angle of attachment power jack 65 to the pins to change as mid-frame 25 is pivoted from side to side.

The foregoing design of tilt mechanism 15 provides several important advantages. First, the angle of inclination of superstructure 14 relative to chassis 13 can be easily adjusted by the machine operator about two independent axes. The operator can adjust the angle of superstructure 14 about longitudinal axis 16 by means of hydraulic cylinders 39 and 40. The operator can adjust the angle of superstructure 14 about transverse axis 17 by raising and lowering power jack 65. Changing the angle of superstructure 14 relative to one of these axes does not affect the angle of superstructure 14 relative to the other axis.

Some prior art four-way tilt mechanisms do not provide independent adjustment of the angle of tilt relative to each of the two axes of the tilt mechanism. With such tilt mechanisms the operator must simultaneously control two separate power circuits to alter the angle of tilt about one of the axes of the mechanism while maintaining the angle of tilt about the other axis of the mechanism.

Secondly, the design described above allows a full range of tilt about each of pivot axes 16, 17 at all times. The range of tilt available about longitudinal axis 16 is not affected by the angle of inclination of top plate 27 relative to transverse axis 17 and vice versa.

A third important feature of the invention is that it provides a tilt mechanism which is able to transmit the forces which are likely to be applied to it through to chassis 13 without excessive play. If tilt mechanism 15 is incorporated in a tree harvesting machine the mechanism must bear several kinds of forces. For example, the mechanism must support the weight of superstructure 14; it must resist horizontal forces from all directions which can arise, for example, when boom 19 is suddenly extended or retracted; and it must resist twisting forces which can arise, for example, when superstructure 14 is swung about vertical axis 23.

The weight of superstructure 14 passes to chassis 13 through power jack 65, and through mid-frame 25 by way of pin 30 and ears 32 and pins 43 and hydraulic cylinders 39 and 40. Spherical bearing 37, which is not generally well adapted to bearing large forces in a direction along shaft 38, does not bear any of the weight of superstructure 14 because pin 30, pins 45 and pins 55 all lie along the same line. Therefore, forces applied to mid-frame 25 from top plate 27 through pins 55 are passed directly into chassis 13 through pins 30 and 45.

The longitudinal component of forces applied to mid-frame 25 is borne by spherical bearing 37. This practically eliminates the play of the front portion of mid-frame 25 between ears 32, 33 along pin 30. Spherical bearing 37 has very little play in any direction perpendicular to vertical mounting shaft 38. Horizontal forces imposed on spherical bearing 37 by mid-frame 25 are transmitted directly to chassis 13 through vertical shaft 38. Spherical bearing 37 and pin 30 together resist the transverse component of horizontal forces applied to mid-frame 25 and torque on mid-frame 25 about a vertical axis.

With the exception of spherical bearing 37, all of the points where mid-frame 25 is connected to other parts of tilt mechanism 15 lie along the same line (namely, transverse axis 17). Therefore, it is impossible for any force exerted on superstructure 14 to twist mid-frame 25 in a direction which would tend to cause spherical bearing 37 to move along shaft 38.

Figure 8:
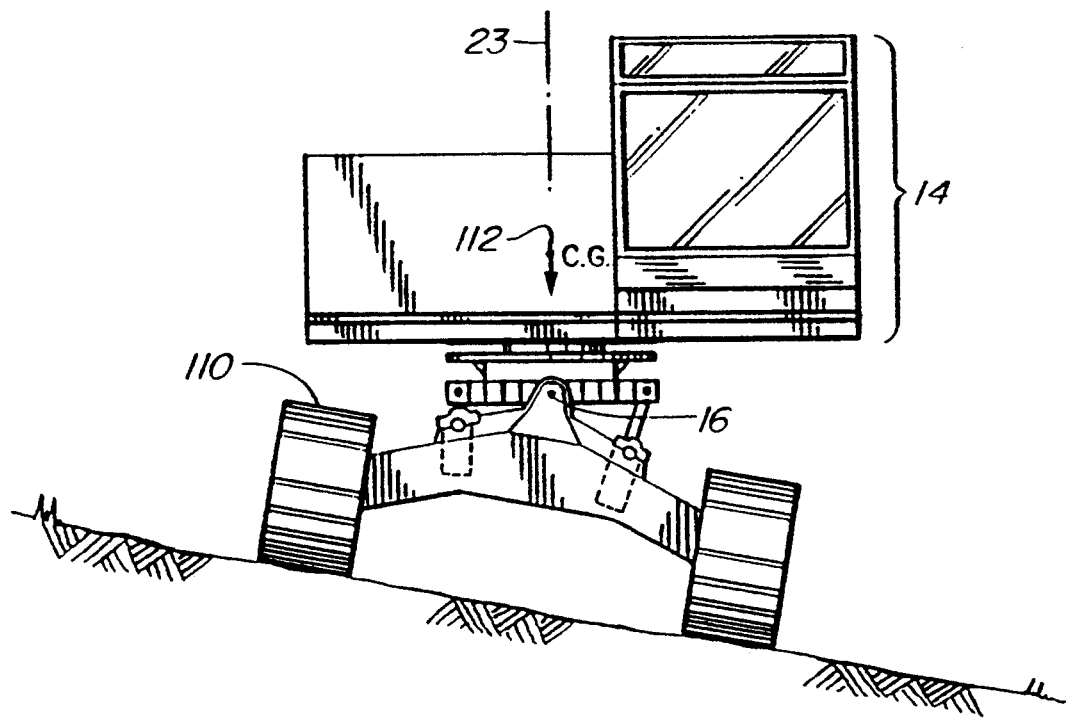
FIG. 8 is a schematic view of the machine of FIG. 1 working on a side slope.

A fourth feature of the invention is that tilt mechanism 15 causes the centre of gravity of machine 10 to move in a way which tends to enhance the machine's stability when tilt mechanism 15 is actuated to level superstructure 14. For example, when machine 10 is travelling on a side-slope, as shown in FIG. 8, it is desirable to have the centre of gravity 112 of superstructure 14 located toward uphill track 110. In a machine without a tilt mechanism the centre of gravity of the machine's superstructure moves downhill when the machine is operated on a side slope. In a machine with a tilt mechanism, centre of gravity 112 can be maintained directly above longitudinal pivot axis 16. It therefore is desirable to locate longitudinal pivot axis 16 as low as possible to keep centre of gravity 112 as close to the uphill side of the machine as possible when the machine is operating on a side slope.

Some prior art machines have four-way tilt mechanisms in which the longitudinal pivot axis is above the transverse pivot axis. Such machines tend to be less stable on side slopes than machines incorporating tilt mechanism 15 according to the invention. In tilt mechanism 15, longitudinal pivot axis 16 is kept low because pivot axis 16 is the axis of a pivotal joint which is directly connected to chassis 13.

When machine 10 is working up a slope, as shown in FIG. 9, it is generally preferable to have centre of gravity 112 as far forward as possible. In tilt mechanism 15 transverse pivot axis 17 is at the forward edge of mid-frame 25, close to and in front of the location of centre of gravity 112 of superstructure 14. Therefore, when top plate 27 is pivoted upwardly and forwardly about axis 17, centre of gravity 112 moves in an arc centred on axis 17. As it does so it moves slightly forward relative to chassis 13. The forward position of centre of gravity 112 tends to enhance the stability of machine 10 on up slopes.

A fifth advantage of the design of tilt mechanism 15 is that the points of attachment of tilt mechanism 15 to chassis 13 are widely separated. This helps to make tilt mechanism 15 very rigid and robust.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A tilt mechanism for pivotally mounting the superstructure of a vehicle to a chassis, said tilt mechanism comprising:

a. a first pivot pin defining a first pivot axis, said first pivot pin passing through an aperture in a first member connected to said chassis and through an aperture in a second member coupled to said superstructure;
   b. a spherical bearing having a center of rotation lying on said first pivot axis;
   c. first connecting means rigidly fixing a first half of said spherical bearing with respect to said first member; and,
   d. second connecting means rigidly fixing a second half of said spherical bearing to said second member;

wherein said second member is pivotable relative to said first member about said pivot axis.

2. The tilt mechanism of claim 1 wherein said spherical bearing is mounted on a generally vertical shaft.

3. The tilt mechanism of claim 1 wherein said first half of said spherical bearing is a ball and said second half of said spherical bearing is a socket.

4. The tilt mechanism of claim 1 further comprising a power jack connected between said chassis and said second member at points away from said first pivot axis for pivoting said second member relative to said first member about said first axis.

5. The tilt mechanism of claim 4 wherein said power jack is a hydraulic cylinder pivotally mounted to said chassis.

6. The tilt mechanism of claim 5 wherein said hydraulic cylinder has a barrel and said barrel is trunnion mounted to a top surface of said chassis.

7. The tilt mechanism of claim 1 further comprising a pivotal connection between said second member and said superstructure for tilting of said superstructure relative to said second member about a second axis perpendicular to said first axis.

8. The tilt mechanism of claim 7 wherein said second pivotal connection comprises a second pivot pin lying along said second axis and passing through an aperture in said second member and through an aperture in a third member coupled to said superstructure.

9. The tilt mechanism of claim 8 wherein said second axis intersects said first axis at a point.

10. The tilt mechanism of claim 9 wherein said point is inside said first pivot pin.

11. The tilt mechanism of claim 8 further comprising a second power jack for tilting said third member relative to said chassis about said second axis, said second power jack pivotally connected to said third member and to said chassis at points away from said second axis.

12. The tilt mechanism of claim 11 wherein said spherical bearing is between said second axis and said second power jack.

13. In a vehicle comprising a chassis, a superstructure mounted to a top plate, and a mechanism for tilting said top plate relative to said chassis about a first axis, the improvement wherein said mechanism comprises:

a. a spherical bearing mounted to said chassis, said spherical bearing having a center of rotation lying on said first axis;
   b. a rotary coupling having a pivot axis lying on said first axis, said rotary coupling mounted to said chassis at a point spaced apart from said spherical bearing;
   c. a rigid mid-frame coupled to said spherical bearing and to said rotary coupling, for pivotal motion of said mid-frame about said first axis; and
   d. means connecting said mid-frame to said top plate.

14. The vehicle of claim 13 further comprising a power jack having a first end pivotally connected to said chassis and a second end pivotally mounted at a point away from said first axis to said mid-frame for adjusting the angle of tilt of said mid-frame about said first axis.

15. The vehicle of claim 13 wherein said spherical bearing is mounted on a vertical shaft.

16. The vehicle of claim 13 wherein said chassis comprises a pair of ears extending upwardly on either side of a portion of said mid-frame and said rotary coupling comprises a pin lying along said axis and passing through apertures in said ears and said portion of said mid-frame.

17. The vehicle of claim 13 wherein said means connecting said mid-frame to said top plate comprises tilting means for tilting said top plate about a second axis perpendicular to said first axis and said tilting means comprises a pivot pin passing through an aperture in said mid-frame and an aperture in a first end of said top plate and a power jack connected between a second end of said top plate and said chassis.

18. The vehicle of claim 17 wherein said power jack is mounted to said chassis at a point below said first axis.

19. The vehicle of claim 17 wherein said first and second pivot axes are in the same plane.

* * * * *